US008845836B2

(12) United States Patent
Losey et al.

(10) Patent No.: US 8,845,836 B2
(45) Date of Patent: Sep. 30, 2014

(54) GEODESIC TIRE AND METHOD OF MANUFACTURE

(75) Inventors: Robert Allen Losey, Kent, OH (US);
Samuel Patrick Landers, North Canton, OH (US); Thulasiram Gobinath, Hudson, OH (US); Luis Antonio Cabrera, Hartville, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 665 days.

(21) Appl. No.: 12/955,083

(22) Filed: Nov. 29, 2010

(65) Prior Publication Data

US 2011/0146874 A1 Jun. 23, 2011

Related U.S. Application Data

(60) Provisional application No. 61/289,762, filed on Dec. 23, 2009.

(51) Int. Cl.
*B29D 30/06* (2006.01)
*B29D 30/20* (2006.01)
*B29D 30/30* (2006.01)

(52) U.S. Cl.
USPC ......... 156/123; 156/110.1; 156/133; 152/548

(58) Field of Classification Search
None
See application file for complete search history.

(56) References Cited

U.S. PATENT DOCUMENTS

| | | | |
|---|---|---|---|
| 1,698,414 A * | 1/1929 | Palmer | 152/453 |
| 1,930,764 A | 10/1933 | Mallory | |
| 2,432,630 A | 12/1947 | Purdy | |
| 2,518,967 A | 8/1950 | Witt | |
| 2,703,128 A | 1/1955 | Darrow | |
| 2,782,830 A | 2/1957 | Wallace | |
| 2,906,314 A * | 9/1959 | Trevaskis | 152/562 |
| 3,062,258 A | 11/1962 | Maiocchi | |
| 3,112,234 A | 11/1963 | Krupp | |
| 3,165,138 A | 1/1965 | Manchetti et al. | |
| 3,183,134 A | 5/1965 | Frisby | |
| 3,442,315 A | 5/1969 | Mirtain | |
| 3,575,227 A | 4/1971 | Bartley | |
| 3,770,041 A | 11/1973 | Abbott | |
| 3,942,574 A | 3/1976 | Bantz | |
| 4,667,721 A | 5/1987 | Cohen et al. | |
| 4,715,420 A | 12/1987 | Kabe et al. | |
| 4,716,951 A | 1/1988 | Suzuki et al. | |
| 4,823,857 A | 4/1989 | Orjela et al. | |

(Continued)

FOREIGN PATENT DOCUMENTS

| | | |
|---|---|---|
| AU | 481576 B2 | 3/1975 |
| FR | 1141940 A | 9/1957 |

(Continued)

OTHER PUBLICATIONS

PCT International Search Report, completed Mar. 15, 2011.

*Primary Examiner* — Justin Fischer

(74) *Attorney, Agent, or Firm* — June E. Rickey

(57) ABSTRACT

A method of making a tire comprising the steps of providing a core; forming a first layer of ply by winding a strip of one or more rubber coated cords onto the core in a geodesic pattern extending from a first shoulder to a second shoulder opposite said first shoulder and being tangent to the bead at a location between said first shoulder and said second shoulder.

20 Claims, 16 Drawing Sheets

(56) References Cited

U.S. PATENT DOCUMENTS

| | | |
|---|---|---|
| 4,832,103 A | 5/1989 | Slivka et al. |
| 4,917,744 A | 4/1990 | Knipp et al. |
| 5,307,853 A | 5/1994 | Okuda |
| 6,068,721 A | 5/2000 | Dyer et al. |
| 6,260,598 B1 | 7/2001 | Tanaka |
| 6,386,258 B1 | 5/2002 | Dyer et al. |
| 6,571,847 B1 | 6/2003 | Ueyoko |
| 6,622,766 B1 | 9/2003 | Baldwin, Jr. |
| 6,991,017 B2 | 1/2006 | Baldwin, Jr. |
| 2001/0001971 A1 | 5/2001 | Cottrell |
| 2001/0042587 A1 | 11/2001 | Caretta et al. |
| 2004/0060633 A1 | 4/2004 | Panning |
| 2004/0154727 A1 | 8/2004 | Wessert et al. |
| 2005/0028915 A1 | 2/2005 | Panning |
| 2005/0028919 A1 | 2/2005 | Panning |
| 2006/0219348 A1 | 10/2006 | Girard |
| 2007/0125471 A1 | 6/2007 | Weissert et al. |
| 2009/0194215 A1 | 8/2009 | Daghini et al. |
| 2011/0146871 A1 | 6/2011 | Laske et al. |
| 2011/0146875 A1 | 6/2011 | Losey et al. |
| 2011/0146876 A1 | 6/2011 | Landers et al. |

FOREIGN PATENT DOCUMENTS

| | | |
|---|---|---|
| GB | 237669 A | 8/1925 |
| GB | 786164 A | 9/1957 |
| GB | 810298 A | 3/1959 |
| GB | 848962 A | 9/1960 |
| JP | 4078703 A | 3/1992 |
| JP | 4183612 A | 6/1992 |
| JP | 7096720 A | 4/1995 |

\* cited by examiner

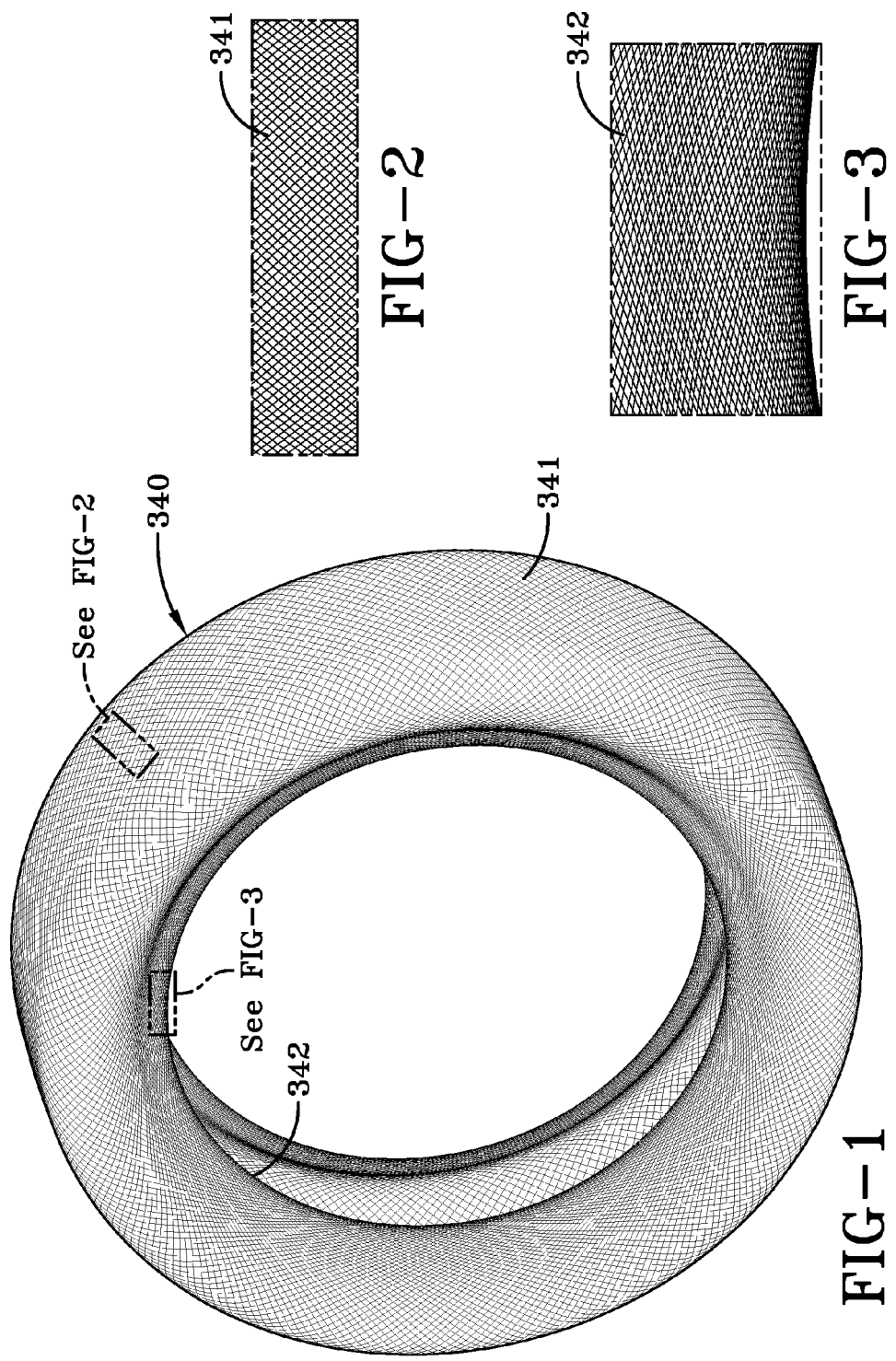

GEODESIC TIRE AND METHOD OF MANUFACTURE

CROSS REFERENCE TO OTHER APPLICATIONS

This application claims the benefit of and incorporates by reference U.S. Provisional Application No. 61/289,762 filed Dec. 23, 2009.

FIELD OF THE INVENTION

The invention is directed to the field of tire manufacturing and tire construction.

BACKGROUND OF THE INVENTION

Tires are typically manufactured on a cylindrical tire building drum with the tire components assembled in layers upon the drum. The carcass or load carrying member of the tire is typically made from one or more layers of ply which are cut and then spliced upon the tire building drum. The ply fabric is formed from a plurality of reinforcements which are coated in rubber prior to application to the drum.

In the early 1900s, bias tires were made of two or more layers of ply wherein the reinforcements were angled with the circumferential direction. The cord angle of the ply layer provided reinforcement in both the radial and circumferential direction. One advantage to bias tires is that since the cords are oriented at an angle, they have strength in the circumferential direction and the radial direction. The disadvantage to bias tires is that the cords of the ply were not placed in the most efficient path possible, resulting in energy loss.

In the 1970s, the radial tire became the industry standard. For the radial ply, the cords have a 90 degree angle with the circumferential direction, so that the cords are normal to the bead, running from bead to bead. One advantage to radial tires is that the cords are oriented efficiently, i.e., the shortest distance between two points. One disadvantage to radial tires is that they have low strength in the circumferential direction. Thus as a radial tire rolls through its contact patch, the tire bulges due to the lack of strength in the circumferential direction. The tire bulge is a source of energy loss which results in increased rolling resistance.

The next generation tire or tire of the future will most likely be a low rolling resistance tire due to the consumer demand for more fuel efficient vehicles. The inventors of this application have discovered that a geodesic tire could represent a viable solution to a low rolling resistance tire due to its unique properties. Geodesic tires are tires whose ply cord paths are geodesic lines on the tire surface, conforming perfectly to the geodesic law for an axisymmetric surface that $\rho \cos \alpha = \pi_o \cos \alpha_o$. The result of the geodesic path is that the cord tension is uniform over the entire cord path, and that shear stresses due to inflation pressure are zero. A true geodesic path is the shortest distance between two points on a surface.

While the math of geodesic tires is described by Purdy, efforts to build a true geodesic tire have been elusive. Most of the efforts have been focused on building a geodesic tire flat on a tire building drum so that the cords would pantograph into the geodesic position upon formation into the final tire shape. This approach has not been proven to result in a geodesic tire. Thus for the foregoing reasons, it is desired to provide an improved method and apparatus for forming a geodesic tire without the above described disadvantages.

DEFINITIONS

"Aspect Ratio" means the ratio of a tire's section height to its section width.

"Axial" and "axially" means the lines or directions that are parallel to the axis of rotation of the tire.

"Bead" or "Bead Core" means generally that part of the tire comprising an annular tensile member, the radially inner beads are associated with holding the tire to the rim being wrapped by ply cords and shaped, with or without other reinforcement elements such as flippers, chippers, apexes or fillers, toe guards and chafers.

"Belt Structure" or "Reinforcing Belts" means at least two annular layers or plies of parallel cords, woven or unwoven, underlying the tread, unanchored to the bead, and having both left and right cord angles in the range from 17° to 27° with respect to the equatorial plane of the tire.

"Bias Ply Tire" means that the reinforcing cords in the carcass ply extend diagonally across the tire from bead-to-bead at about 25-65° angle with respect to the equatorial plane of the tire, the ply cords running at opposite angles in alternate layers.

"Breakers" or "Tire Breakers" means the same as belt or belt structure or reinforcement belts.

"Carcass" means a layer of tire ply material and other tire components. Additional components may be added to the carcass prior to its being vulcanized to create the molded tire.

"Circumferential" means lines or directions extending along the perimeter of the surface of the annular tread perpendicular to the axial direction; it can also refer to the direction of the sets of adjacent circular curves whose radii define the axial curvature of the tread as viewed in cross section.

"Cord" means one of the reinforcement strands, including fibers, which are used to reinforce the plies.

"Inner Liner" means the layer or layers of elastomer or other material that form the inside surface of a tubeless tire and that contain the inflating fluid within the tire.

"Inserts" means the reinforcement typically used to reinforce the sidewalls of runflat-type tires; it also refers to the elastomeric insert that underlies the tread.

"Ply" means a cord-reinforced layer of elastomer-coated cords.

"Radial" and "radially" mean directions radially toward or away from the axis of rotation of the tire.

"Sidewall" means a portion of a tire between the tread and the bead.

"Laminate structure" means an unvulcanized structure made of one or more layers of tire or elastomer components such as the innerliner, sidewalls, and optional ply layer.

BRIEF DESCRIPTION OF THE DRAWINGS

The invention will be described by way of example and with reference to the accompanying drawings in which:

FIG. 1 is a perspective view of a tire carcass having geodesic cords;

FIG. 2 is a close up view of the cords of the tire carcass in the crown area;

FIG. 3 is a close up view of the cords of the tire carcass in the bead area;

DETAILED DESCRIPTION OF THE INVENTION

Figure 13:
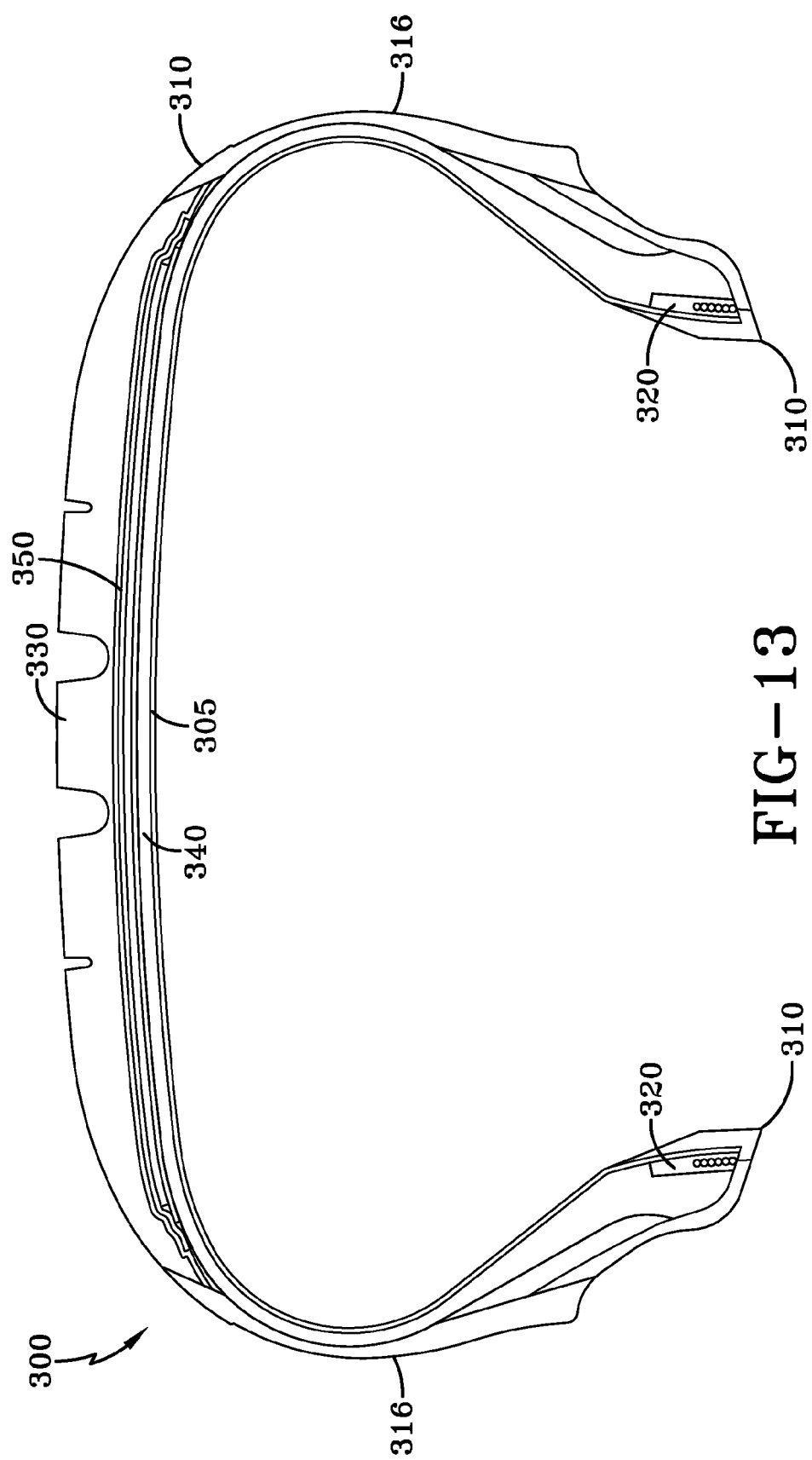
FIG. 13 illustrates a cross-sectional view of a passenger tire of the present invention.

A cross-sectional view of a tire having geodesic cords is shown in FIG. 13. As shown, the tire 300 may be representative of a passenger tire and comprises a pair of opposed bead areas 310, each containing one or more column beads 320 embedded therein. As compared to a tire of the same size, the tire of the present invention has a greatly reduced bead due to the carcass configuration, as described in more detail, below. The tire 300 may further comprises sidewall portions 316 which extend substantially outward from each of the bead area 310 in the radial direction of the tire. A tread portion 330 extends between the radially outer ends of the sidewall portions 316. Furthermore, the tire 300 is reinforced with a carcass 340 toroidally extending from one of the bead areas 310 to the other bead area 310. A belt package 350 is arranged between the carcass 340 and the tread.

FIGS. 1-3 illustrate the tire carcass 340 of the present invention wherein the cords are arranged in geodesic lines. As shown in FIG. 2, the crown portion 341 of an exemplary passenger tire of size 225 60R16 has spaced apart plies with the angle of about 48 degrees (which varies depending upon the overall tire size). As shown in FIG. 3, the bead area 342 of the tire has closely spaced cords with the cords tangent to the bead. Thus the ply angle continuously changes from the bead core to the crown. A geodesic path on any surface is the shortest distance between two points or the least curvature. On a curved surface such as a torus, a geodesic path is a straight line. A true geodesic ply pattern follows the mathematical equation exactly:

$$\pi \cos \alpha = \pi_0 \cos \alpha_0$$

wherein $\pi$ is the radial distance from the axis of rotation of the core to the cord at a given location;

$\alpha$ is the angle of the ply cord at a given location with respect to the mid-circumferential plane;

$\pi_0$ is the radial distance from the axis of rotation of the core to the crown at the circumferential plane, and $\alpha_0$ is the angle of the ply cord with respect to the tread centerline or midcircumferential plane.

Figure 4B:
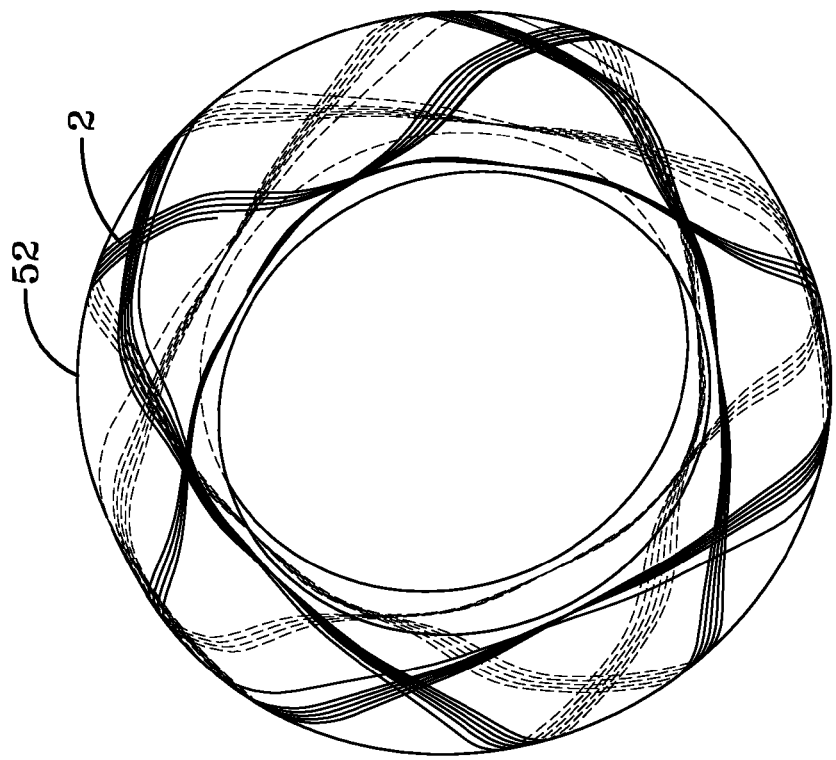
FIG. 4B illustrates the cord winding on a tire blank of FIG. 5a after multiple passes.
Figure 4A:
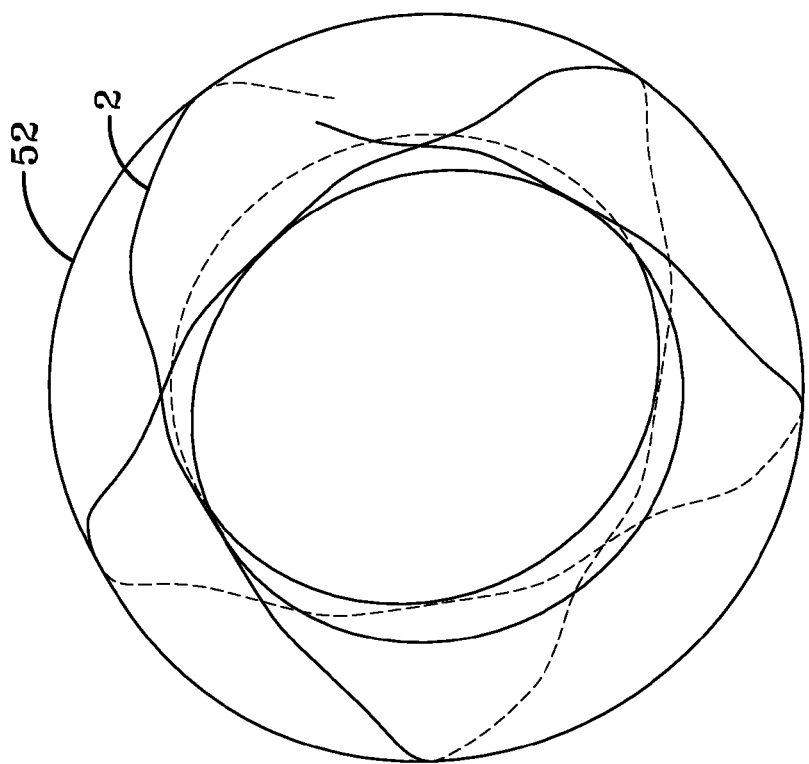
FIG. 4A illustrates the initial cord winding on a tire blank in a geodesic pattern.
Figure 5:
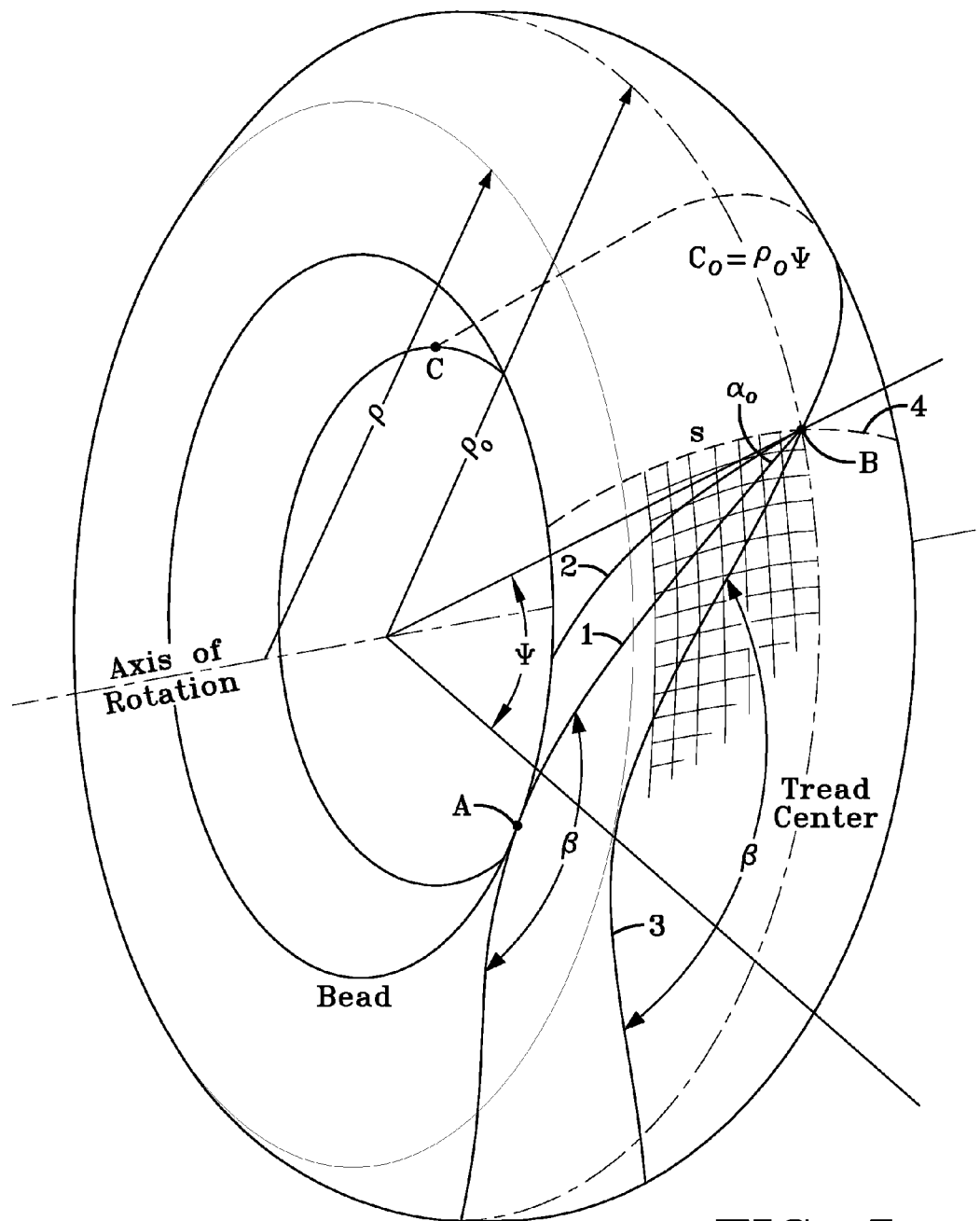
FIG. 5 illustrates various geodesic curves.
Figure 6:
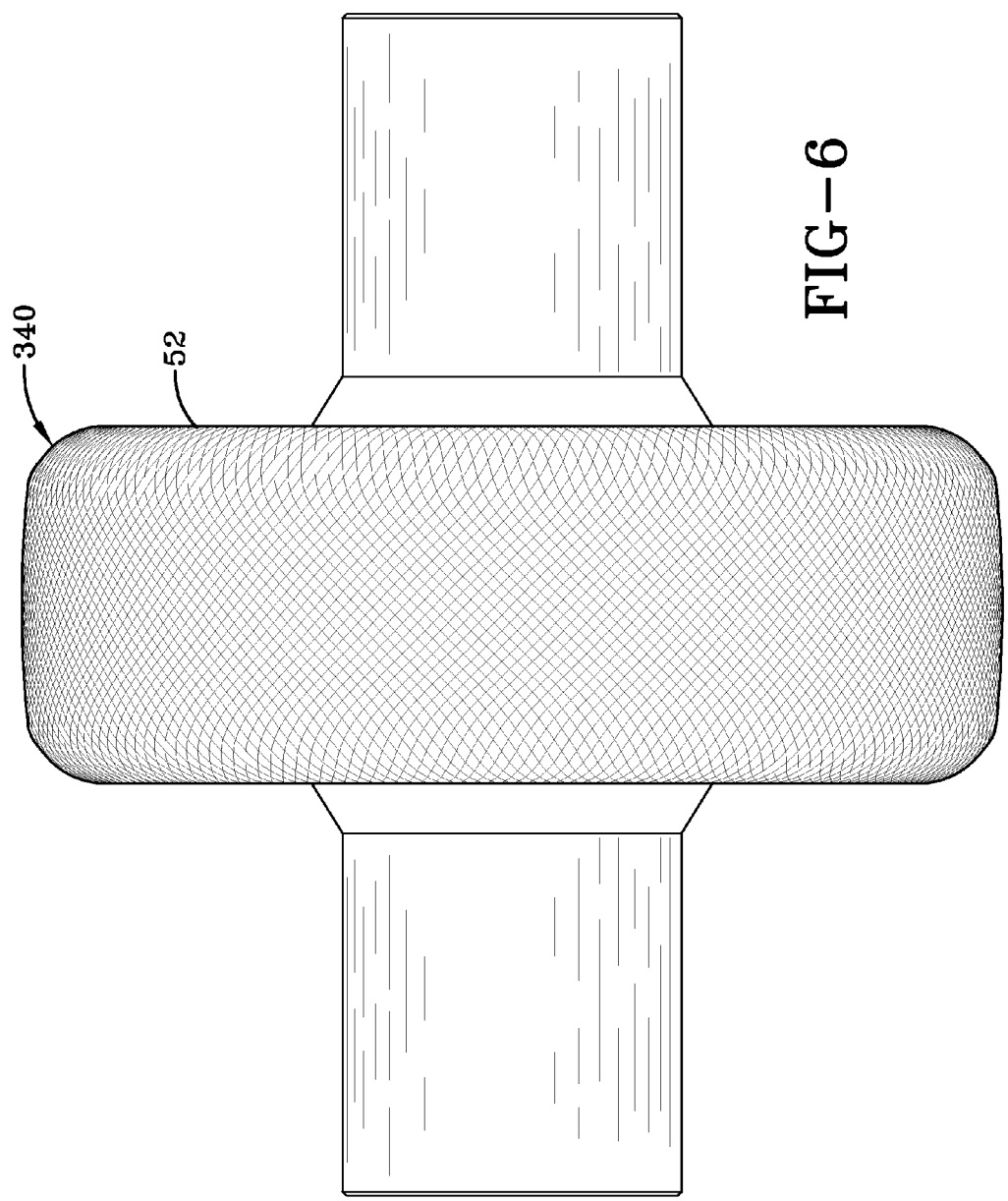
FIG. 6 illustrates a front view of a tire carcass having geodesic cords of the present invention.
Figure 7:
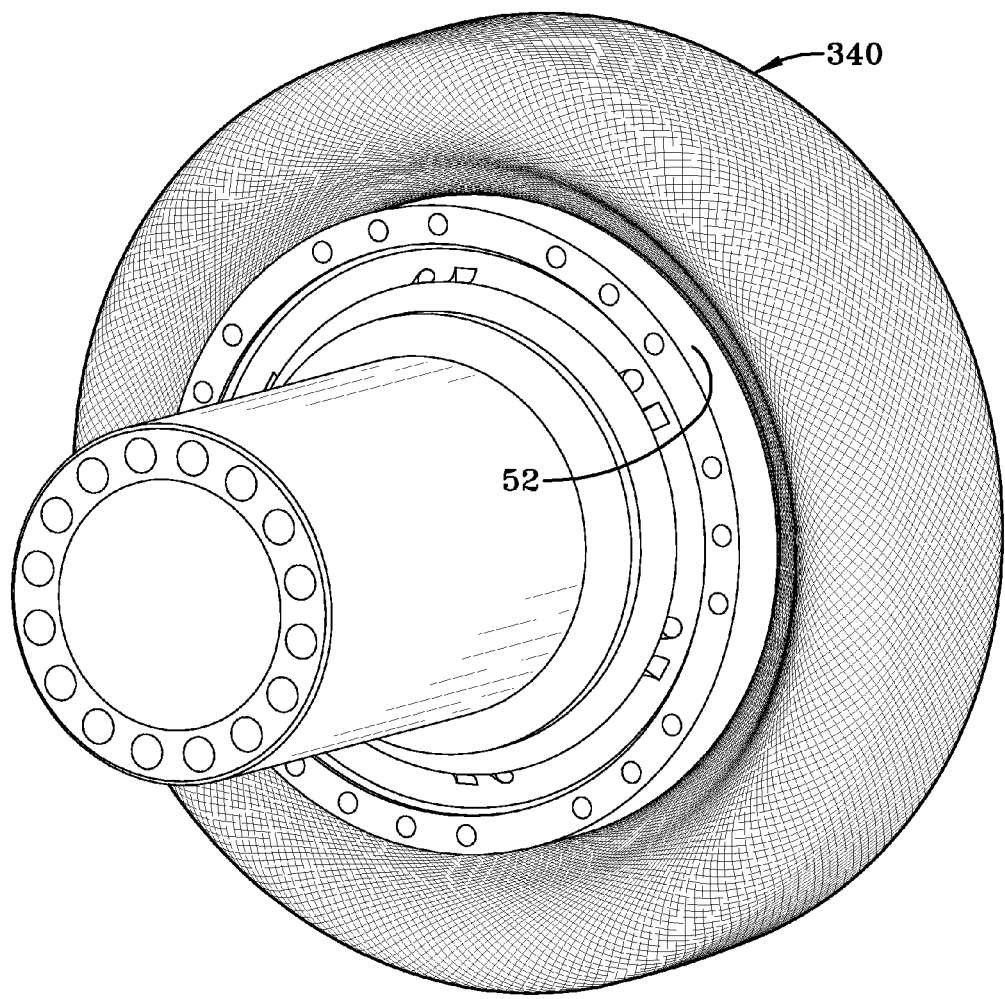
FIG. 7 illustrates a side view of the carcass of FIG. 7.
Figure 8:
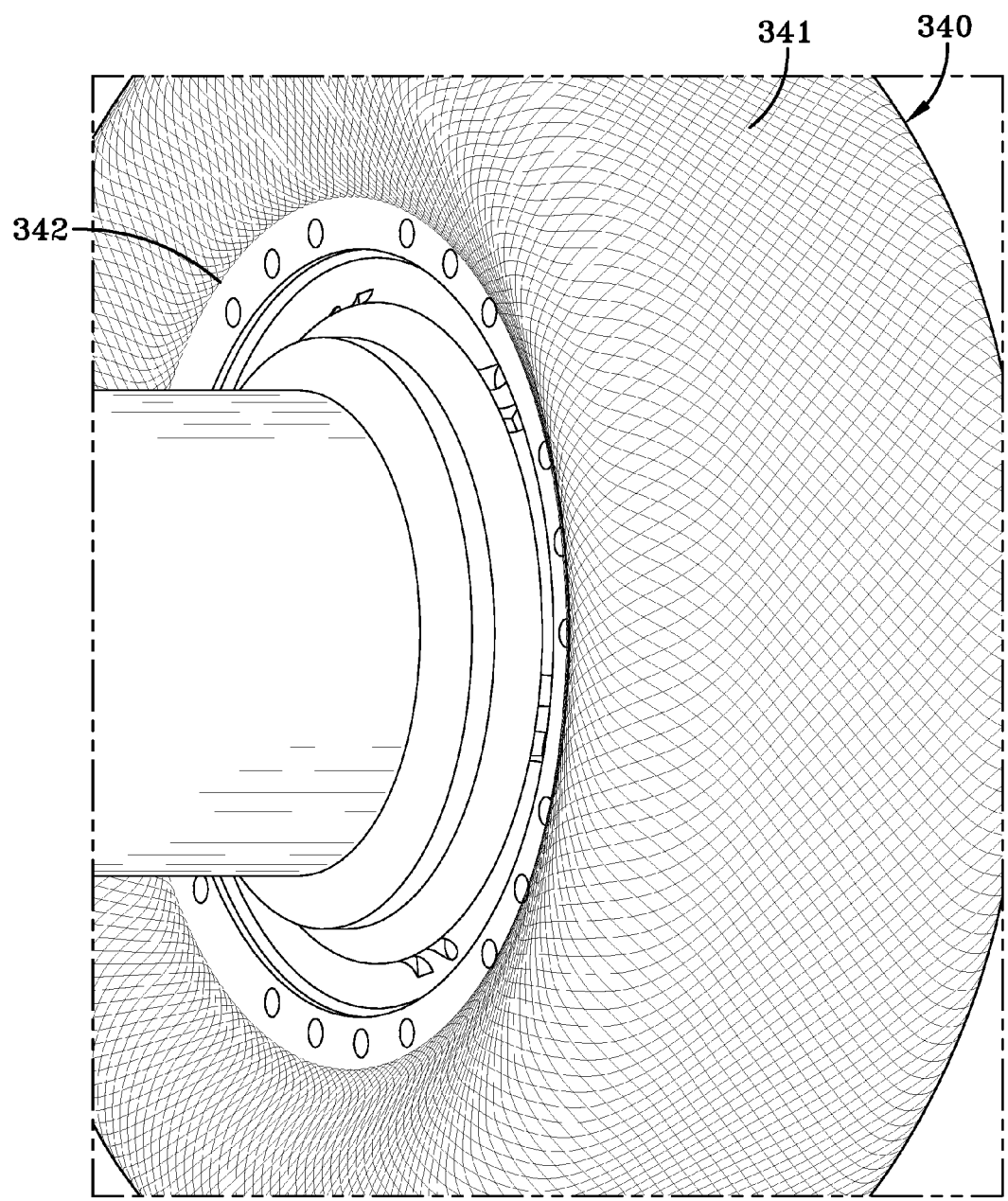
FIGS. 8 and 9 illustrate a close up perspective view of the bead area of the carcass of FIG. 7.
Figure 9:
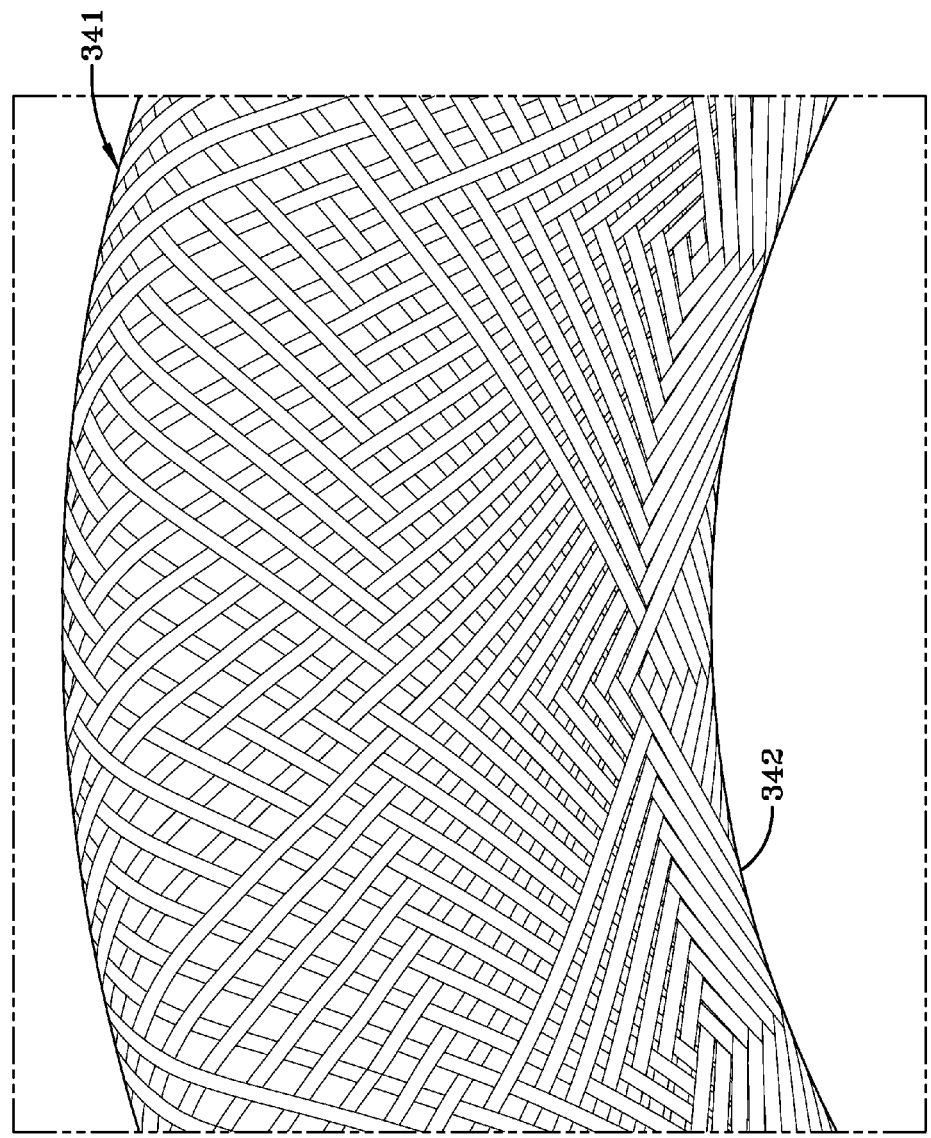

FIG. 5 illustrates several different ply path curves of a tire having geodesic cords. One well known embodiment of a geodesic tire is the radial tire and is shown as curve 4, wherein the cords have an angle $\alpha$ of 90 degrees with respect to the circumferential plane. Curves 1, 2 and 3 of FIG. 5 also illustrate other geodesic cord configurations. Curve 1 is a special case of a geodesic cord pattern wherein the cord is tangent to the bead circle, and is referred to herein as an orbital ply. FIGS. 4A-4B illustrate a carcass 340 having an orbital ply configuration and in various stages of completion. For curve 1 of FIG. 5, the following equation applies:

At $\pi=\pi\text{bead}$, the angle $\alpha$ is zero because the cords are tangent to the bead.

$$\alpha = \cos^{-1}(\pi\text{bead}/\pi)$$

FIGS. 6-9 illustrate a first embodiment of a green tire carcass of the present invention. The tire is illustrated as a passenger tire, but is not limited to same. The cords of the carcass are arranged in a geodesic orbital pattern wherein the cords are tangent to the bead radius of the tire. The close proximity of the cords results in a very large buildup of cord material in the bead area. In order to overcome this inherent disadvantage, the inventors modified the ply layup as described in more detail, below.

Apparatus

Figure 10:
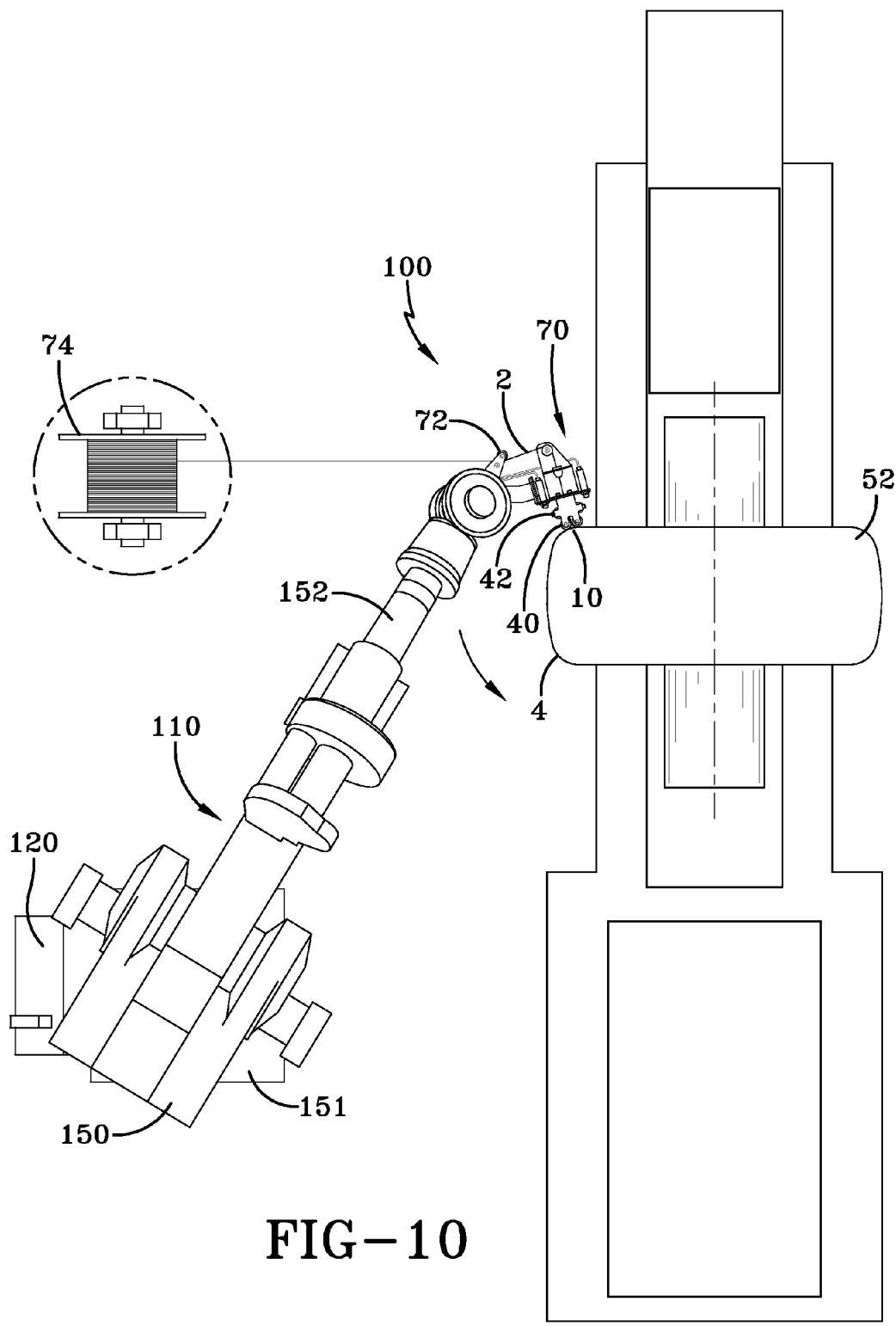
FIGS. 10-11 illustrate a first embodiment of an apparatus for laying ply on a tire blank.
Figure 11:
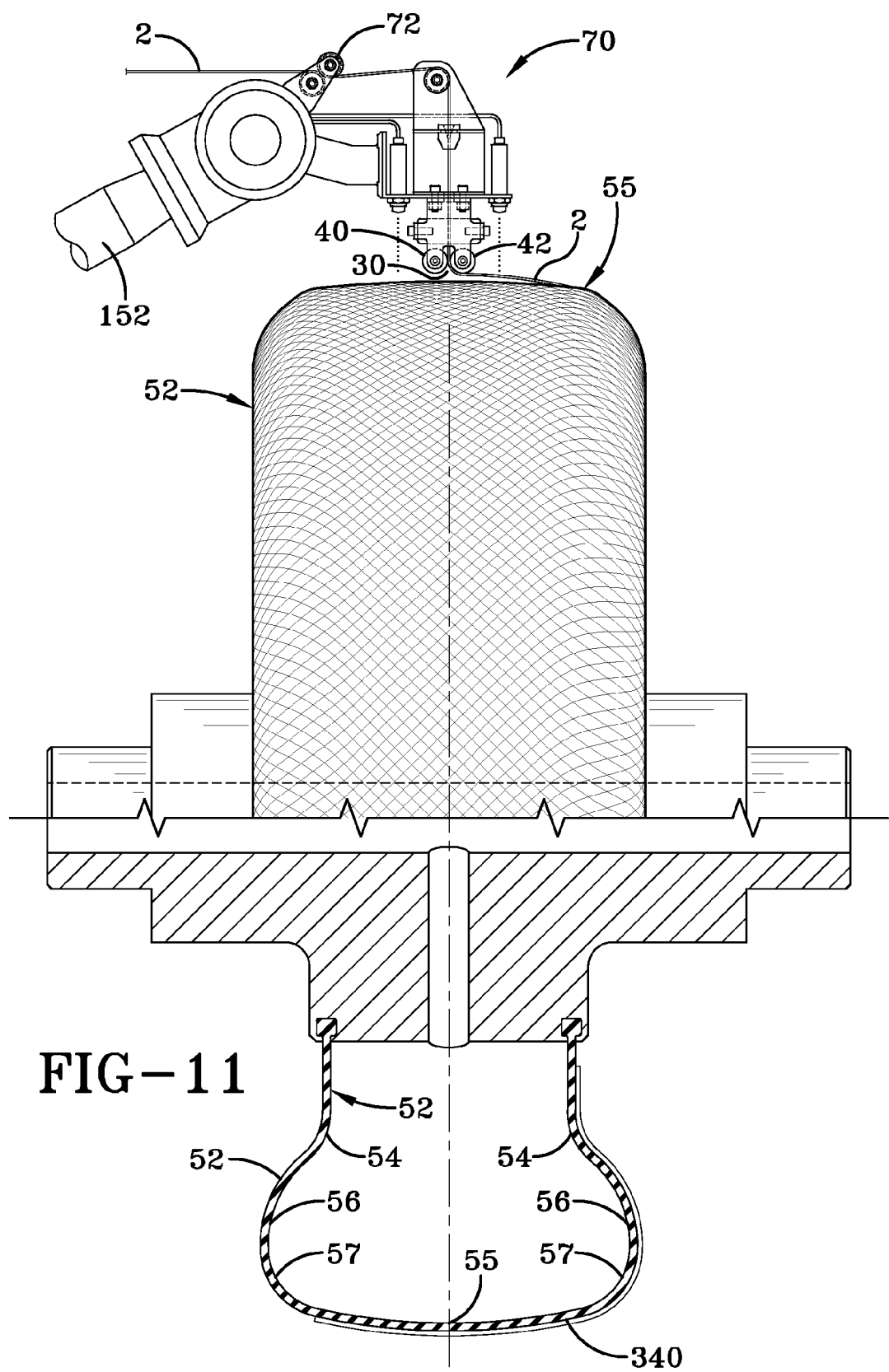

In a first embodiment of the invention, the tire 300 having a carcass with geodesic ply is formed on a core 52. The core may be in the shape of a cylinder such as a tire building drum, but is preferable in the shape of the final tire. The core has a first end, a second end and a outer core surface located between the first end and the second end. The outer core surface is preferably shaped to closely match the inner shape of the tire. The core may be rotatably mounted about its axis of rotation and is shown in FIGS. 10 and 11. The core may be collapsible or formed in sections for ease of removal from the tire. The core may also contain internal heaters to partially vulcanize the inner liner on the core. The core may be optionally disposable.

Next, an inner liner 305 is applied to the core. The inner liner may be applied by a gear pump extruder using strips of rubber or in sheet form or by conventional methods known to those skilled in the art. An optional bead, preferably a column bead 320 of 4 or more wires may be applied in the bead area over the inner liner.

Next, a strip of rubber having one or more rubber coated cords 2 is applied directly onto the core over the inner liner as the core is rotated. With reference to FIGS. 10-11, a perspective view of an apparatus 100 in accordance with the present invention is illustrated. As shown the apparatus 100 has a guide means which has a robotic computer controlled system 110 for placing the cord 2 onto the toroidal surface of core 52. The robotic computer controlled system 110 has a computer 120 and preprogrammed software which dictates the ply path to be used for a particular tire size. Each movement of the system 110 can be articulated with very precise movements.

The robot 150 which is mounted on a pedestal 151 has a robotic arm 152 which can be moved in preferably six axes. The manipulating arm 152 has a ply mechanism 70 attached as shown. The robotic arm 152 feeds the ply cord 2 in predetermined paths 10. The computer control system coordinates the rotation of the toroidal core 52 and the movement of the ply mechanism 70.

The movement of the ply mechanism 70 permits convex curvatures to be coupled to concave curvatures near the bead areas thus mimicking the as molded shape of the tire.

With reference to FIG. 11, a cross-sectional view of the toroidal core 52 is shown. As illustrated, the radially inner portions 54 on each side 56 of the toroidal mandrel 52 have a concave curvature that extends radially outward toward the crown area 55 of the toroidal mandrel 52. As the concave cross section extends radially outward toward the upper sidewall portion 57, the curvature transitions to a convex curvature in what is otherwise known as the crown area 55 of the toroidal mandrel 52. This cross section very closely duplicates the molded cross section of a tire.

To advance the cords 2 on a specified geodesic path 10, the mechanism 70 may contain one or more rollers. Two pairs of rollers 40, 42 are shown with the second pair 42 placed 90° relative to the first pair 40 and in a physical space of about one inch above the first pair 40 and forms a center opening 30 between the two pairs of rollers which enables the cord path 10 to be maintained in this center. As illustrated, the cords 2 are held in place by a combination of embedding the cord into the elastomeric compound previously placed onto the toroidal surface and the surface tackiness of the uncured compound. Once the cords 2 are properly applied around the entire circumference of the toroidal surface, a subsequent lamination of elastomeric topcoat compound (not shown) can be used to complete the construction of the ply 20.

The standard tire components such as chafer, sidewall, and tread may be applied to the carcass and the tire cured in a conventional mold. The tire may further include an optional bead having a significantly reduced area and weight. One example of a bead suitable for use with the tire of the invention comprises a column bead 320 having ⅔ reduction in weight as the standard tire.

Figure 12:
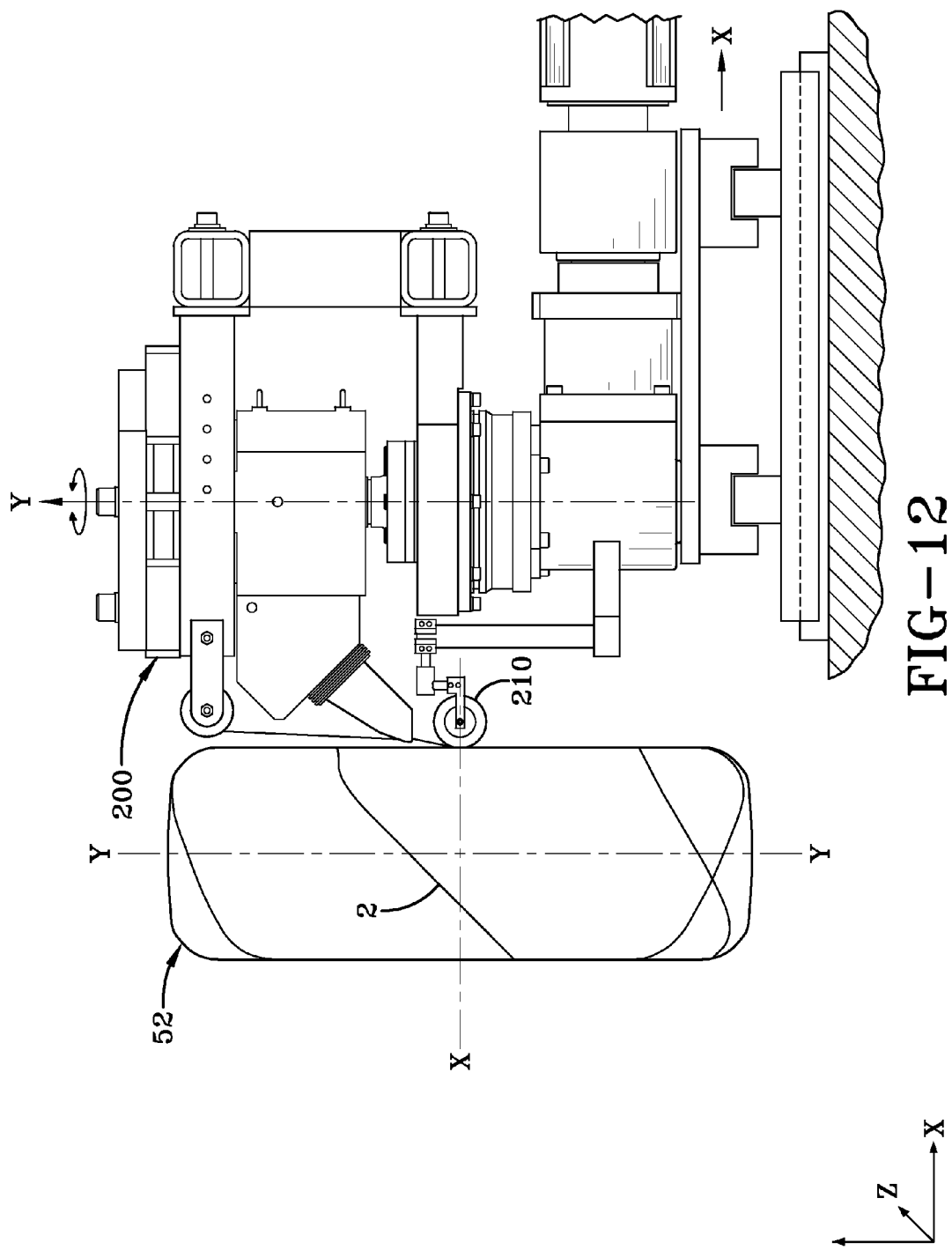
FIG. 12 illustrates a second embodiment of an apparatus for laying ply on a tire blank.

A second embodiment of an apparatus suitable for applying ply in a geodesic pattern onto a core is shown in FIG. 12. The apparatus includes a ply applier head 200 which is rotatably mounted about a Y axis. The ply applier head 200 can rotate about the Y axis+/−100 degrees. The rotation of the ply applier head 200 is necessary to apply the cord in the shoulder and bead area. The ply applier head 200 can thus rotate about rotatable core 52 on each side in order to place the ply in the sidewall and bead area. The ply applier head 200 is mounted to a support frame assembly which can translate in the X, Y and Z axis. The ply applier head has an outlet 202 for applying one or more cords 2. The cords may be in a strip form and comprise one or more rubber coated cords. Located adjacent the ply applier head 200 is a roller 210 which is pivotally mounted about an X axis so that the roller can freely swivel to follow the cord trajectory. The ply applier head and stitcher mechanism are precisely controlled by a computer controller to ensure accuracy on placement of the ply. The tire core is rotated as the cord is applied. The tire core is rotated discontinuously in order to time the motion of the head with the core. The ply applier head and stitcher apparatus is specially adapted to apply cord to the sidewalls of the tire core and down to and including the bead area.

The strip of rubber coated cords are applied to the core in a pattern following the mathematical equation $\pi \cos \alpha$=constant. FIG. 5 illustrates ply curves 1, 2, and 3 having geodesic ply paths. Curves 2 and 3 illustrate an angle $\beta$, which is the angle the ply makes with itself at any point. For the invention, the angle $\beta$ is selected to be in the range strictly greater than 90 degrees to about 180 degrees. Preferably, the geodesic path (or orbital path) of the invention is ply curve 2 with $\beta$ about equal to 180 degrees. For ply curve 2, if a point on the curve is selected such as point A, the angle of ply approaching point A will be equal to about 180 degrees. Likewise, the angle of the ply going away from point A will also be about 180 degrees. Thus for any point on curve 2, the angle of ply approaching the point and leaving the point will be about 180 degrees, preferably substantially 180 degrees.

As shown in FIG. 5, the angle $\alpha_0$ is selected so that the cord is tangent to the bead. Starting at a point A, the cord is tangent to the bead. Curve 1 of FIG. 5 illustrates the cord path from point A to the center crown point B, which is an inflection point. The cord continues to the other side of the tire wherein the cord is tangent at point C. The process is repeated until there is sufficient coverage of the core. Depending on the cord size and type selection, the cords are wound for 300 to 450 revolutions to form the carcass. Since the cords are tangent to the bead at multiple locations, the build up of the cords in the bead area form a bead.

As described above, the ply cords are applied to the core in a pattern following the mathematical equation $\pi \cos \alpha$=constant. Using a three dimensional grid of data points of the core, a calculation of all of the discrete cord data points satisfying the mathematical equation $\pi \cos \alpha$=constant may be determined. The three dimensional data set of the core is preferably $X, Y, \Psi$ coordinates, as shown in FIG. 5. A starting point for the calculation is then selected. The starting point is preferably point A of FIG. 5, which is the point of tangency of the cord at the bead location. An ending point is then selected, and is preferably point C of FIG. 5. Point C represents the point of tangency on the opposite side of the tire compared to point A. Next the change in $\Psi$ is calculated from point A to point C. The desired cord path from the starting point A to ending point C is then determined from the three dimensional data set using a method to determine the minimum distance from point A to point C. Preferably, dynamic programming control methodology is used wherein the three dimensional minimum distance is calculated from point A to point C. A computer algorithm may be used which calculates each distance for all possible paths of the three dimensional data set from point A to point C, and then selects the path of minimal distance. The path of minimum distance from point A to point C represents the geodesic path. The discrete data points are stored into an array and used by the computer control system to define the cord path. The process is them repeated from point C to the next point of tangency and repeated until sufficient coverage of the carcass occurs.

Geodesic Ply with Indexing

In a variation of the invention, all of the above is the same except for the following. The strip is applied starting at a first location in a first continuous strip conforming exactly to $\pi \cos \alpha$=constant for N revolutions. N is an integer between 5 and 20, preferably 8 and 12, and more preferable about 9. After N revolutions, the starting point of the strip for the second continuous strip is moved to a second location which is located adjacent to the first location. The strip is not cut and remains continuous, although the strip could be cut and indexed to the starting location. The above steps are repeated until there is sufficient ply coverage, which is typically 300 or more revolutions. The inventors have found that this small adjustment helps the ply spacing to be more uniform.

Radius Variation

In yet another variation of the invention, all of the above is the same except for the following. In order to reduce the buildup at the bead area, the radius $\pi$ is varied in the radial direction by +/−delta in the bead area of the tire on intervals of Q revolutions. Delta may range from about 2 mm to about 20 mm, more preferably from about 3 to about 10 mm, and most preferably about 4 to about 6 mm. The radius is preferably varied in a randomized fashion. Thus for example, if Q is 100, then for every 100 revolutions, the radius may be lengthened about 5 mm, and in the second 100 revolutions, the radius may be shortened about 5 mm.

Another way of varying the radius is at every Qth revolution, the radius is adjusted so that the point of tangency is incrementally shortened by gamma in the radial direction, wherein gamma varies from about 3 mm to about 10 mm. Q may range from about 80 to about 150, and more preferably from about 90 to about 120 revolutions. Thus for example, Q may be about 100 revolutions, and gamma may be about 5 mm. Thus for every 100 revolutions, the radius may be shortened by 5 mm in the radial direction. The variation of the radius may be preferably combined with the indexing as described above.

Axial Variation

In yet another variation, all of the above is the same as described in any of the above embodiments, except for the following. In order to account for the buildup at the bead area, the cord axial dimension is increased in the bead area. Thus there is a deviation in the geodesic equation at the bead area. In the vicinity of the bead area, wherein π is <some value, a new X value is calculated to account for the buildup of material in the bead area. A new X value is calculated based upon the cord thickness. The new X value may be determined using a quadratic equation. The π and α values remain unchanged.

Dwell Variation

In yet another variation, all of the above is the same as described in any of the above embodiments, except for the following. In order to reduce the buildup at the bead area, a dwell angle Ψ is utilized. Thus instead of there being one point of tangency at the bead, the angle Ψ is dwelled a small amount on the order of 5 about degrees or less while the other variables remain unchanged. The dwell variation is useful to fill in gaps of the cord in the bead area.

Cord Construction

The cord may comprise one or more rubber coated cords which may be polyester, nylon, rayon, steel, flexten or aramid.

Test Results

Figure 14:
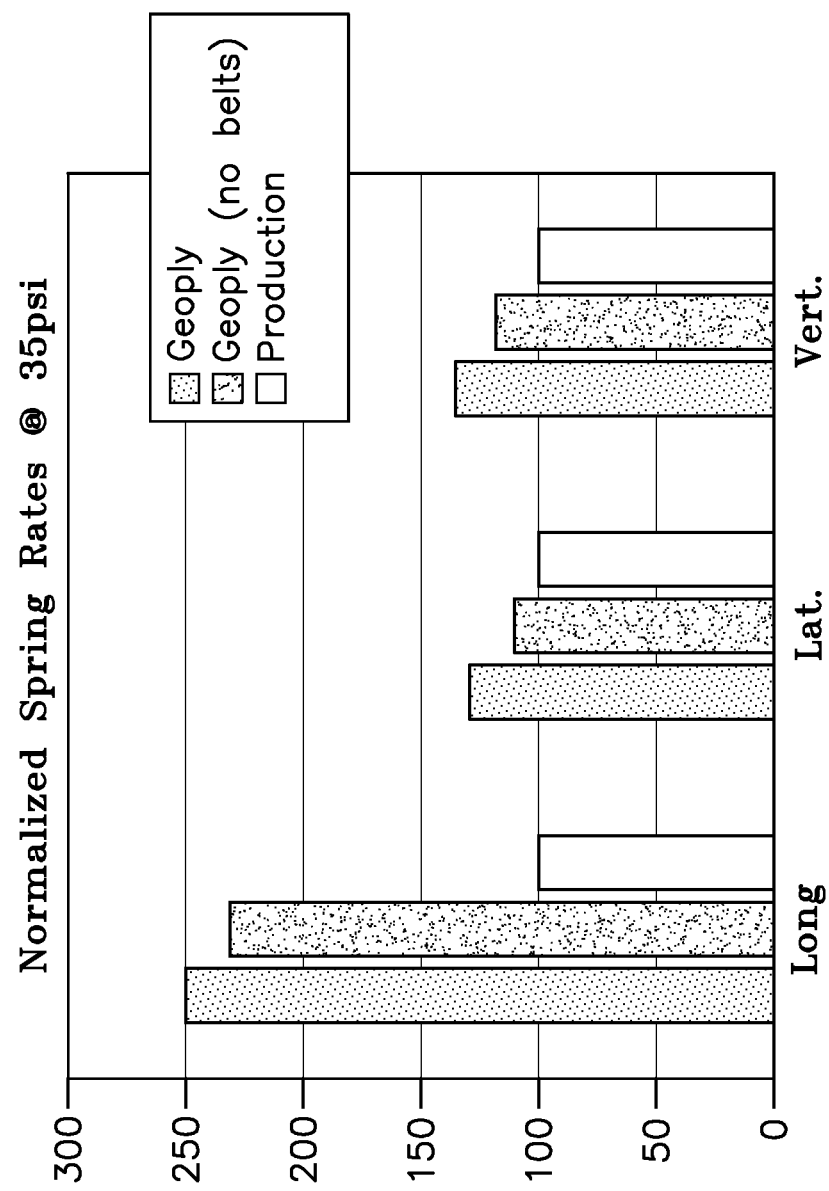
FIG. 14 illustrates various test tire performance for normalized spring rate.
Figure 15:
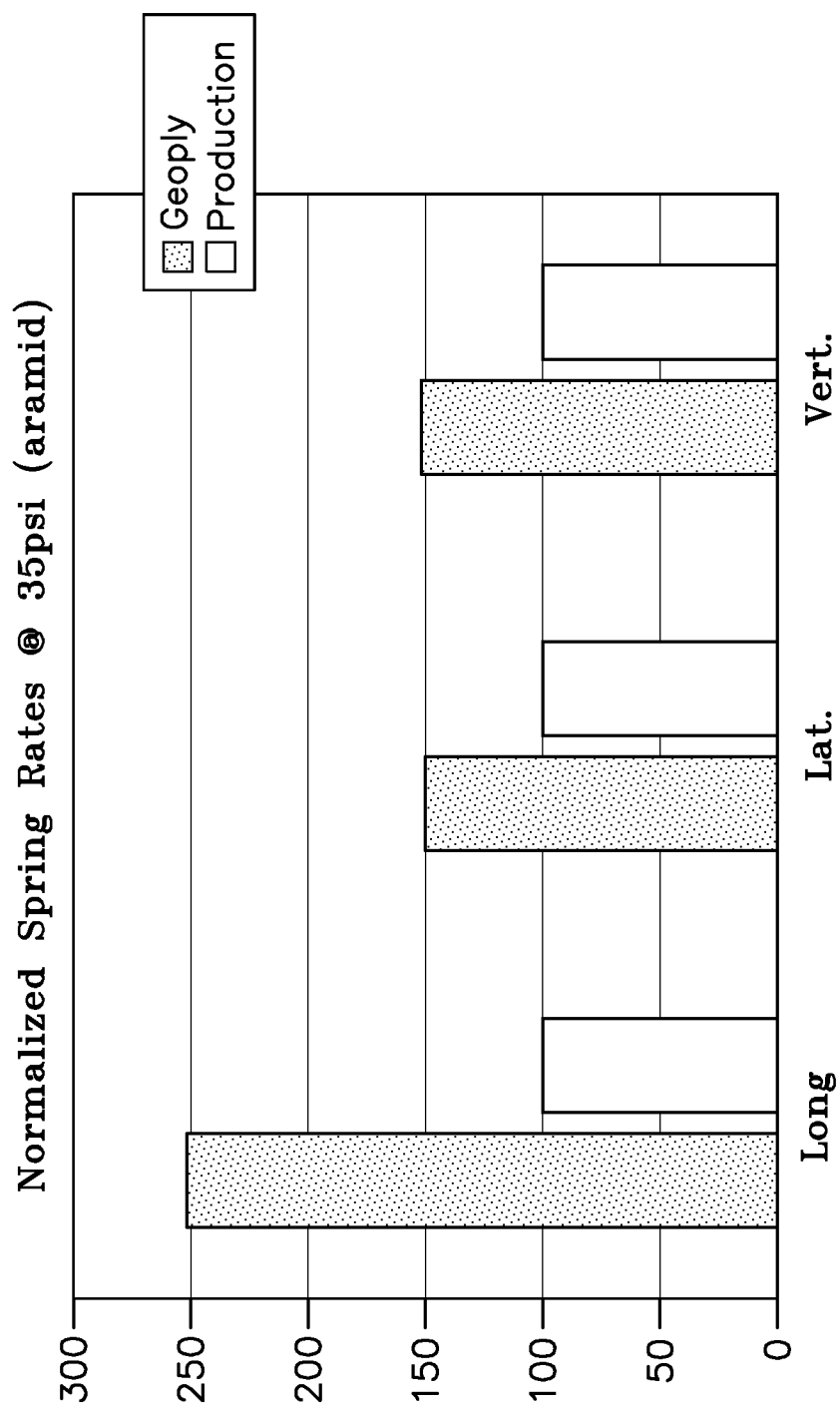
FIG. 15 illustrates various test tire performance for normalized spring rate for aramid ply.

Test tires of size P225/R60-16 were built having a geoply construction with both aramid and polyester cord. The geoply test tires were built with indexing every 9th iteration and having the cord tangent to the bead at certain locations. The angle β was selected to be 180 degrees. The test tire built using polyester cord had 400 total revolutions of cord, and with the starting location of the cord at every 9th revolution being indexed an amount 0.0012 m. The aramid construction tire had about 350 revolutions and an indexing factor of 0.0015 m. Each test tire included typical tire components and a single column 6 wire bead. Test tires were also built having no bead. The test tires were compared with a production tire having a size P225R60-16 and sold under the brand name GOODYEAR EAGLE RSA. As shown in FIGS. 14 and 15, the geoply tire for both aramid cord and polyester cord showed a significantly higher normalized spring rate for the longitudinal, lateral and vertical direction. For the longitudinal spring rate, the geoply tire (both aramid and polyester construction) had a 50% greater spring rate than the production tire. The aramid cords that were utilized in the tire construction trials had a modulus of elasticity range of 18,000-50,000 MPa and TPI (twist per inch) in the range 9×9-16×16. It is preferred to have a TPI closer to the lower end of the stated range. The cord construction of the aramid cord had a DTEX of 1100/2 & DENIER 1000/2. The polyester cords that were utilized in the tire construction had a modulus of elasticity of about 8000 MPa, TPI 8.5×8.5, DTEX, 1670/2 and DENIER 1500/2.

Rolling Resistance Test Data

Figure 16:
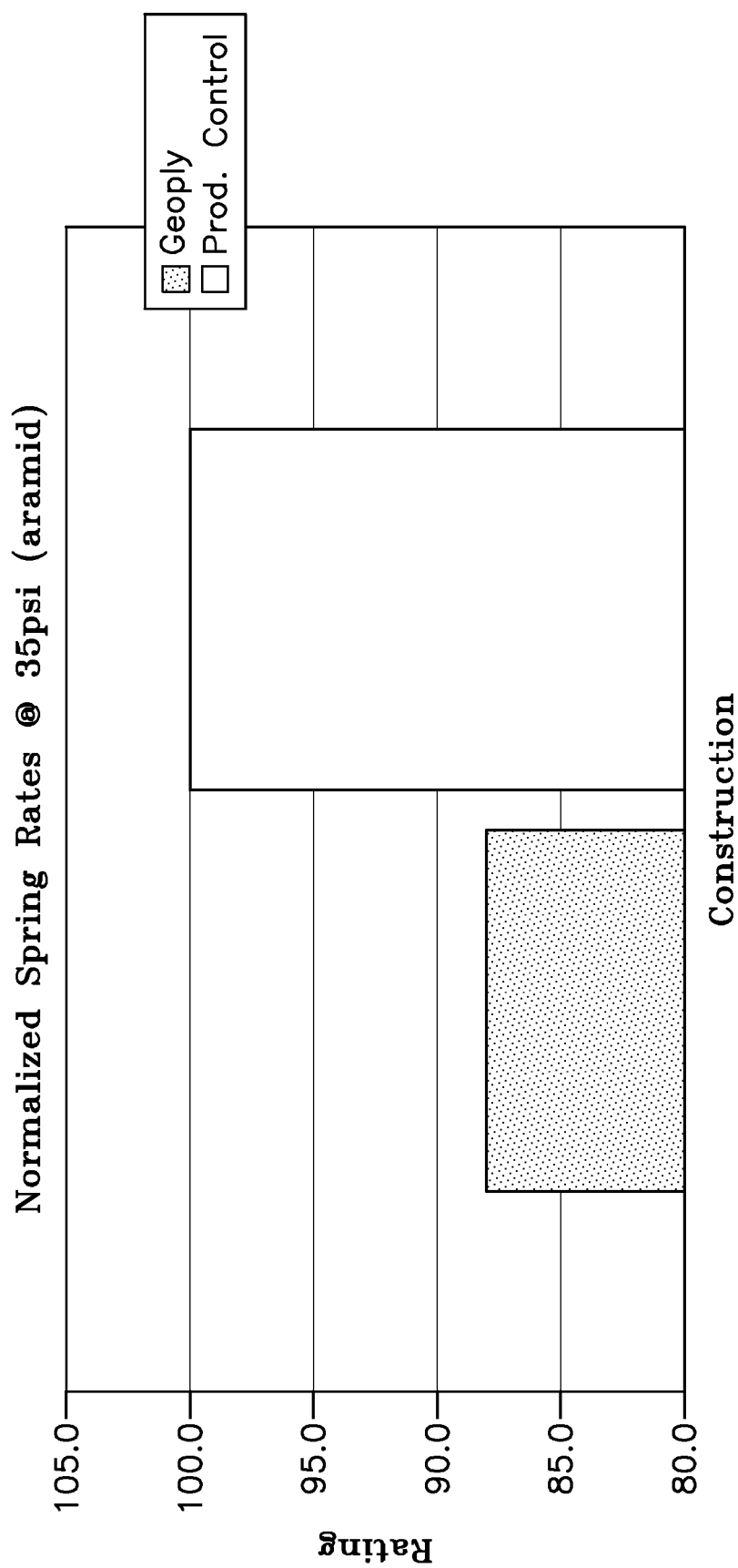
FIG. 16 illustrates rolling resistance data for a control and aramid geoply tire.
Figure 17:
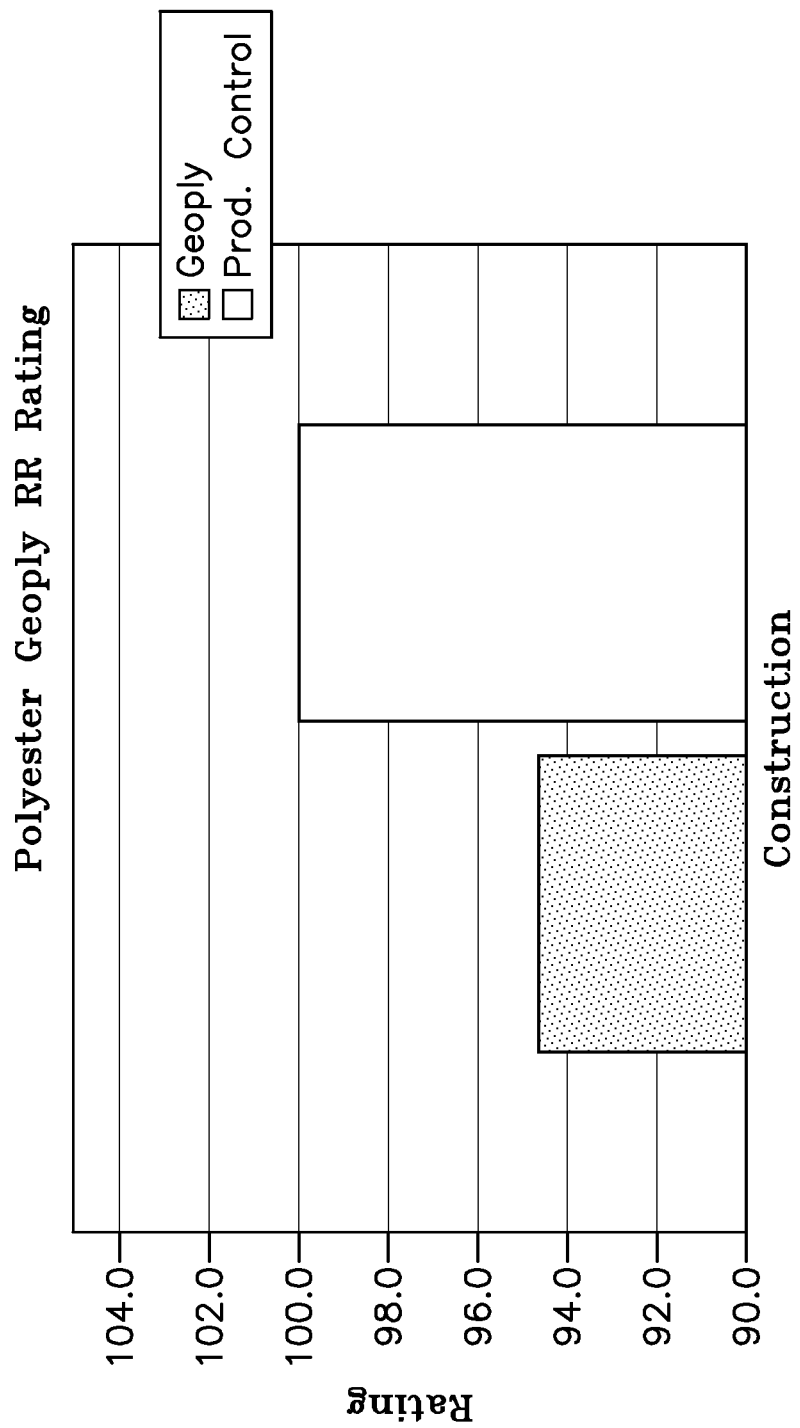
FIG. 17 illustrates rolling resistance data for a control and polyester geoply tire.

As shown in FIG. 16, the aramid geoply tire had a 12.3% improvement in rolling resistance as compared to the production control tire. As shown in FIG. 17, the polyester geoply tire showed a 5.4% improvement in rolling resistance compared to the production control. The better results for the aramid tire are believed to be due to the fact that the aramid tire has the highest vertical spring rate. Due to lower deflection, the tire consumes less energy. The improvement in rolling resistance was surprising and unexpected.

Figure 18:
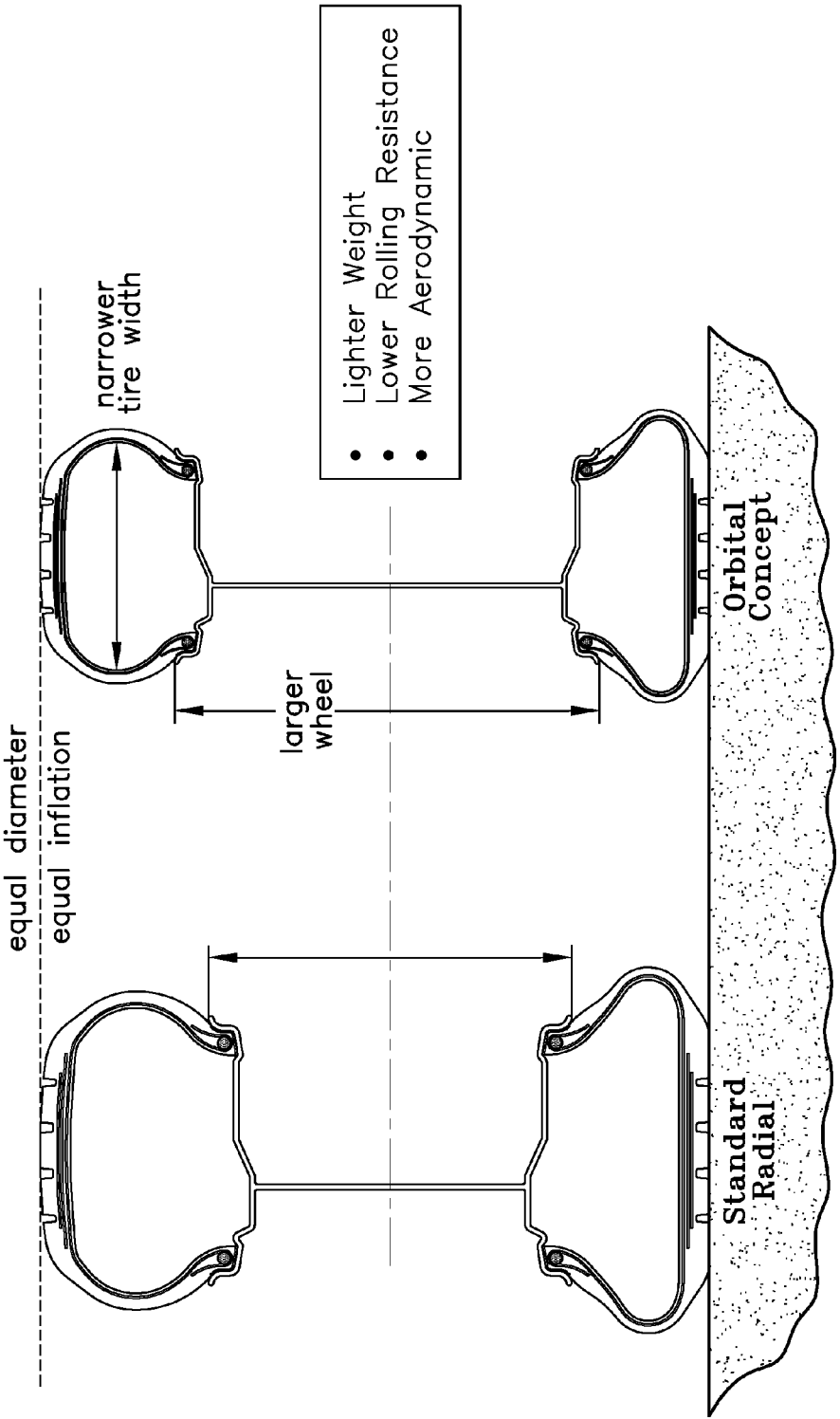
FIG. 18 illustrates a cross-sectional view of a prior art radial passenger tire with a tire of the present invention.

FIG. 18 illustrates a cross-sectional view of a standard radial tire as compared to a tire having an orbital ply of the present invention. For the same outside diameter, the load carrying characteristics of the orbital ply construction allow for a smaller size tire. Thus in one example, the wheel may be larger as shown with a narrower tire width. The orbital ply tire would result in a lighter weight, more aerodynamic tire with lower rolling resistance.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. A method of making a tire comprising the steps of providing a torus shaped core having a first side for forming a first sidewall, a second side for forming a second sidewall, and an outer circumferential surface between said first side and said second side for forming a tread area; forming a layer of ply by winding a strip of one or more cords onto the torus-shaped core in a geodesic pattern starting at a first point, wherein the cord extends from a first side to the tread area and then to the second side in a repeating geodesic pattern, wherein on each sidewall portion of the tire the angle β of the ply with respect to itself is strictly greater than 90 degrees wherein the geodesic pattern is interrupted every Nth revolution, and a second starting point of every Nth revolution is moved to be located adjacent the first point, and then winding the strip in a continuous manner following the geodesic pattern for another N−1 revolution, wherein N is an integer in the range of 2 to about 20.

2. The method of claim 1 wherein the strip is continuous.

3. The method of claim 1 wherein the strip is discontinuous.

4. The method of claim 1 wherein the torus shaped core is a tire building drum in a second stage position.

5. The method of claim 1 wherein the angle β of the ply with respect to itself is substantially 180 degrees.

6. The method of claim 1 wherein the angle β of the ply is a constant throughout.

7. The method of claim 1 wherein the angle β of the ply with respect to itself is 180 degrees or less.

8. The method of claim 1 wherein the core external dimensions are substantially equal to the internal dimensions of the finished tire.

9. The method of claim 1 wherein the core is rotatable.

10. The method of claim 1 wherein the cord is tangent to a point located at the radially innermost point of the first side or the second side.

11. The method of claim 1 wherein the pattern is interrupted every Nth revolution, and a third starting point of every Nth revolution is moved to be located adjacent the second starting point, and then winding the strip in a continuous manner following the geodesic pattern for another N−1 revolution, wherein N is an integer in the range of 2 to about 20.

12. The method of claim 1 wherein for at least one revolution of the ply around the core, a radius of the ply is adjusted plus or minus delta.

13. The method of claim 1 wherein for every revolution of the ply around the core, a radius of the ply is adjusted plus or minus delta incrementally.

14. The tire of claim 1 wherein the tire further comprises two column beads.

15. The tire of claim 1 wherein the ply is formed of a single continuous cord.

16. The tire of claim 1 wherein the ply is formed from a continuous strip of one or more reinforcement cords.

17. The tire of claim 1 wherein the angle $\beta$ of the ply with respect to itself is substantially 180 degrees throughout the layer of ply.

18. The tire of claim 1 wherein the angle $\beta$ of the ply is a constant throughout the layer of ply.

19. A method of making a tire comprising the steps of
providing a torus shaped core having a first side for forming a first sidewall, a second side for forming a second sidewall, and an outer circumferential surface between said first side and said second side for forming a tread area; forming a layer of ply by winding a strip of one or more cords onto the torus-shaped core in a geodesic pattern starting at a first point, wherein the cord extends from a first side to the tread area and then to the second side in a repeating geodesic pattern, wherein on each sidewall portion of the tire the angle $\beta$ of the ply with respect to itself is strictly greater than 90 degrees, wherein for at least three revolutions of the ply around the core, a radius of the ply is adjusted plus or minus delta in a random fashion.

20. A method of making a tire comprising the steps of
providing a torus shaped core having a first side for forming a first sidewall, a second side for forming a second sidewall, and an outer circumferential surface between said first side and said second side for forming a tread area; forming a layer of ply by winding a strip of one or more cords onto the torus-shaped core in a geodesic pattern starting at a first point, wherein the cord extends from a first side to the tread area and then to the second side in a repeating geodesic pattern, wherein on each sidewall portion of the tire the angle $\beta$ of the ply with respect to itself is strictly greater than 90 degrees wherein a radius is adjusted at least one revolution so that the point of tangency is shortened by gamma in the radial direction, wherein gamma varies from about 3 mm to about 10 mm.

\* \* \* \* \*